United States Patent [19]

Geller

[11] Patent Number: 5,301,051
[45] Date of Patent: Apr. 5, 1994

[54] MULTI-CHANNEL, COVERT, NON-LINE-OF-SIGHT UV COMMUNICATION

[75] Inventor: Myer Geller, San Diego, Calif.

[73] Assignee: The United States of America as represented by the Secretary of the Navy, Washington, D.C.

[21] Appl. No.: 165,207

[22] Filed: Mar. 8, 1988

[51] Int. Cl.⁵ .................. H04B 10/10; H04V 14/02
[52] U.S. Cl. ................... 359/124; 250/374; 359/109; 359/172
[58] Field of Search ............ 455/606, 607, 609, 611, 455/617, 618, 619; 370/3; 250/372, 374

[56] References Cited

U.S. PATENT DOCUMENTS

| 4,286,158 | 8/1981 | Charpak et al. | 250/374 |
| 4,376,892 | 3/1983 | Charpak et al. | 250/372 |
| 4,379,252 | 4/1983 | Work | 313/639 |
| 4,402,090 | 8/1983 | Gfeller | 455/617 |
| 4,493,114 | 1/1985 | Geller et al. | 455/617 |

Primary Examiner—Leslie Pascal
Attorney, Agent, or Firm—Harvey Fendelman; Thomas Glenn Keough

[57] ABSTRACT

A system enables omnidirectional non-line-of-sight simultaneous communications in a number of frequency separated channels in the ultraviolet spectrum. A plurality of discharge lamps each has at least a single different isotope of mercury for each omnidirectionally radiating a discrete line in the ultraviolet spectrum. Each of the discrete lines in the ultraviolet spectrum is modulated by an on-off sequence generator so that modulated discrete lines transmit communications to a number of receivers randomly disposed in a non-line-of-sight relationship to the discharge lamps. Aborption filters at each receiver contain a quenching gas and all the other isotopes of mercury except the one which generated the modulated discrete line of interest. Photons from the other discrete lines in the ultraviolet spectrum which do not contain the information of interest are dissipated and quenched by the isotopes responsive to the radiation and the quenching gas, so that the modulated discrete line in the ultraviolet spectrum passes through the filter and to a photo-multiplier tube where the information provides representative output pulses for appropriate use. Simultaneous communications within the solar blind region are assured for non-line-of-sight transmitters and receivers within a limited range so that communications are not compromised.

6 Claims, 4 Drawing Sheets

1

MULTI-CHANNEL, COVERT, NON-LINE-OF-SIGHT UV COMMUNICATION

STATEMENT OF GOVERNMENT INTEREST

The invention described herein may be manufactured and used by or for the Government of the United States of America for governmental purposes without the payment of any royalties thereon or therefor.

This application is related to copending applications in the United States and Trademark Office Ser. No. 880,513 now U.S. Pat. No. 4,731,881, "Narrow Spectral Bandwidth UV Solar-Blind Detector" by Myer Geller and Ser. No. 925,853 entitled "Large Spectral Bandwidth UV Solar-Blind Detector" by Myer Geller.

BACKGROUND OF THE INVENTION

A non-line-of-sight communication system has been designed which utilizes modulated omnidirectional ultraviolet radiation in the solar-blind region of the electromagnetic spectrum. This system is disclosed in U.S. Pat. No. 4,493,114 and provides reliable short range communications. A single communication link used 253.7 nm UV radiation to provide for secured communications since the UV was totally absorbed beyond relatively short distances. While this concept has proven successful for single link communications, a multi-channel capability relying upon frequency separation in the solar-blind region has yet to be produced to enable simultaneous communications among several users.

Thus, a continuing need exists in the state-of-the-art for a multichannel communication system relying upon frequency separation in the solar-blind region of the electromagnetic spectrum to enable simultaneous, short range communications.

SUMMARY OF THE INVENTION

The present invention is directing to providing an apparatus for omnidirectionally communicating, non-line-of-sight in a plurality cf frequency separated channels in the ultraviolet spectrum to provide the capability for simultaneous communications in the solar-blind region of the electromagnetic spectrum. A plurality of discharge lamps is each provided with a discrete mercury isotope for each generating a discrete line in the ultraviolet spectrum. The discrete lines are modulated and omnidirectionally radiated in a series of on-off pulses by a current modulator. Receiving sets that each include at least one filter and a photo-multiplier tube are disposed from the omnidirectionally generating means in a non-line-of-sight relationship for receiving and demodulating the scattered parts of the omnidirectionally radiated, modulated, discrete lines. Each filter contains a quenching gas and the other isotopes of mercury that define discrete lines in the ultraviolet spectrum which are other than the modulated discrete line of a selected communication. Photons of the modulated discrete line of the selected communication pass through the filter while the other discrete lines are absorbed and quenched by the other isotopes of mercury and quenching gas. The photomultiplier tube is disposed in-line with its respective filter to give representative output pulses of the passed photons of the modulated discrete line of the selected communication.

An object of the invention is to provide a non-line-of-sight communication system having a multichannel capability which is limited in range.

Another object of the invention is to provide for a multichannel communication capability within the solar-blind region of the electromagnetic spectrum.

A further object is to provide for an omnidirectionally radiating non-line-of-sight communication system employing several isotopes of mercury in respective discharge tubes for transmitting modulated distinct lines in the ultraviolet spectrum.

Another object is to provide for a multichannel communication capability employing modulated discrete hyperfine lines which are composed in the 253.7 nm resonance line of a low pressure mercury discharge tube.

Still another object is to provide for the modulation of discrete lines each created by a discharge lamp having a single isotope of mercury therein and the selective demodulation thereof.

Still another object is to provide a non-line-of-sight communication system using a plurality of discrete mercury isotope discharge tubes each transmitting a modulated discrete line in the ultraviolet spectrum and at least one receiver having filters containing selected ones of the isotopes and a quenching gas so as to pass a desired communication in a modulated discrete line to a photomultiplier tube for providing representative signals.

Yet still a further object of the invention is to provide for an omnidirectional non-line-of-sight multichannel communication system in the ultraviolet spectrum that permits simultaneous communications via modulated discrete lines in the ultraviolet spectrum by the selective discharge and modulation of mercury isotope discharge tubes and the selective demodulation thereof.

These and other objects of the invention will become more readily apparent from the ensuing specification and drawings when taken in conjunction with the appended claims.

DESCRIPTION OF THE PREFERRED EMBODIMENTS

Non-line-of-sight communications in the solar-blind region of the electromagnetic spectrum have been demonstrated in the above referenced U.S. Pat. No. 4,493,114. This patent omnidirectionally radiates a modulated signal in the solarblind region of the ultraviolet spectrum, at and around 253.7 nm. For this purpose one or more commercially available mercury argon discharge lamps were used which contained natural mercury to produce the 253.7 nm carrier frequency. This carrier was modulated by an appropriate series of on-off actuations of the discharge lamp and transmitted it to a receiver that had a wide field of view filter and a photomultiplier tube. Only one transmission could occur within a particular transmitter station's range of operation since the entire modulated spectrum at 253.7 nm was used for a single communication in a given area.

Figure 1:
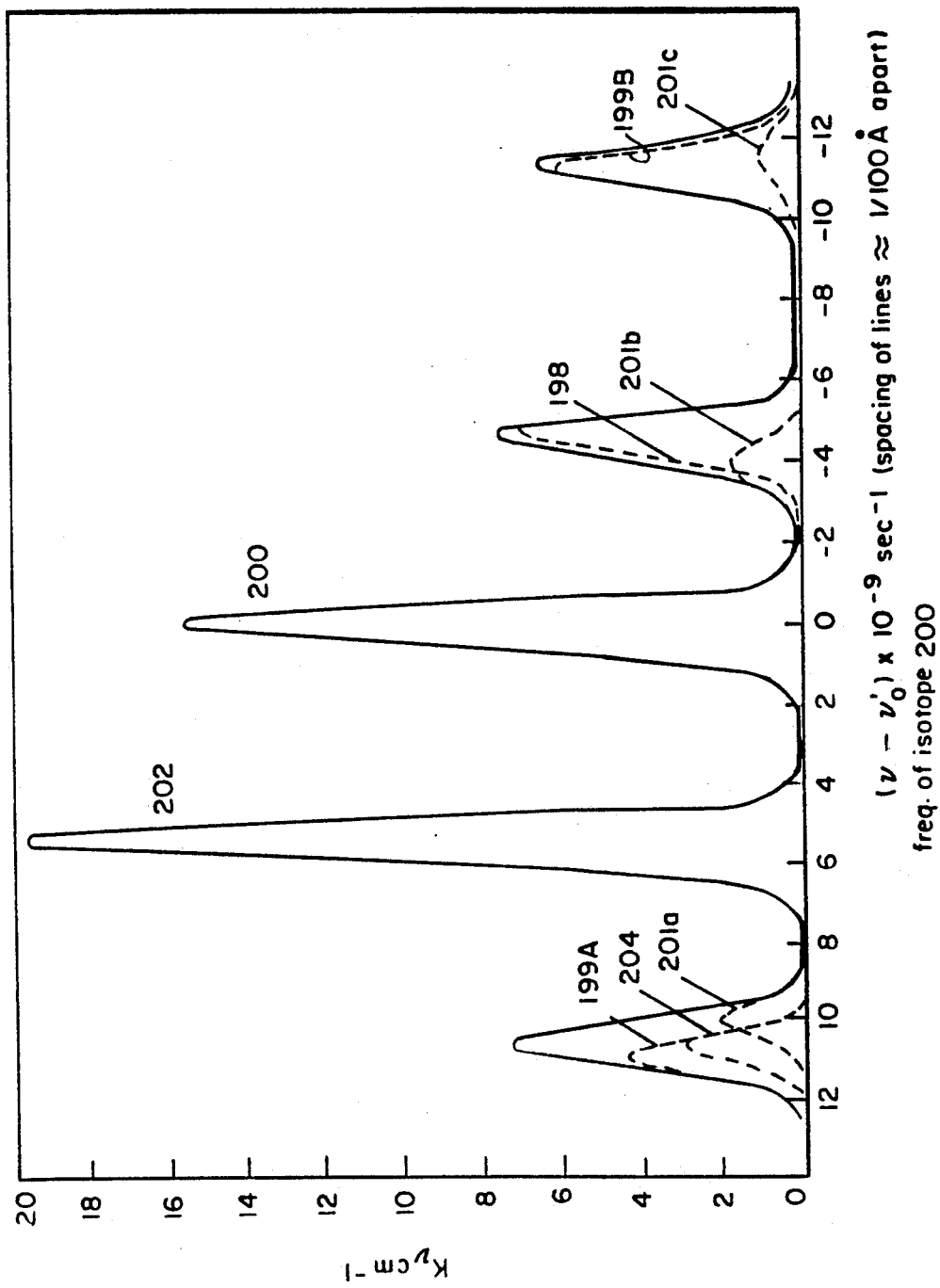
FIG. 1 shows the absorption coefficient or the hyperfine absorption lines of natural mercury at 253.7 nm (t=31 degrees centigrade).

The commercial mercury-argon discharge germicidal lamps identified in the 4,493,114 patent emitted 2537Å radiation at a relative high efficiency. Upon further examination, the 2537 Å line was found to be the superposition of a large number of hyperfine lines, see FIG. 1. The origin of the hyperfine line structure arises from the small mass differences among many mercury isotopes. The spectrum (absorption) of each of the hyperfine lines of natural mercury at t=31 degrees centigrade can be identified to one of several mercury isotopes. The total width of the complete spectrum is 24G Hz (0.05 Å). The relative peaks of these lines is attributed to the relative abundance of the isotopes occurring in natural mercury. The isotope $Hg^{196}$ is missing since it is relatively rare; however, it can be used when a sufficient quantity of it can be refined for it is a stabled isotope. For purposes of the multichannel communication system, the even isotopes of mercury, those being $Hg^{198, 200, 200, 202}$ and $^{204}$ were found to emit only a single line since the magnetic spin component of each of these isotopes is zero.

The multichannel communication capability of this invention is attributed to the fact that the 253.7 nanometer, or 2537Å, resonant line of a low pressure mercury-argon discharge tube is actually composed of the five separate hyperfine lines of interest. These hyperfine lines are due to the seven different isotopes $Hg^{196}$, $Hg^{198}$, $Hg^{199}$, $Hg^{200}$, $Hg^{201}$, $Hg^{202}$, and $Hg^{204}$ that forms nature mercury. Because of the differences in the $^3P_1$ and $^1S_0$ energy levels between the different isotopes, each isotope emits its own set of hyperfine lines for the $^3P_1$-$^1S_0$ transition. The lines form five groups, so that natural mercury emits five hyperfine $^3P_1$-$^1S_0$ UV lines that are very close together spectrally at 253.7 nanometers.

The even isotopes each have only a single hyperfine line which is distinct from the hyperfine lines of all the other even isotopes. Therefore, by using only the even isotopes of mercury, a set of distinct hyperfine lines are available for multichannel communication purposes. The relative abundances of the even mercury isotopes are sufficient to enable their isolation and individual placement in separate discharge tubes so that the distinct lines can be radiated. Even isotope $Hg^{196}$ while rare can be refined for a discharge of the discrete line associated with it; however, this isotope may have a higher cost.

Figure 2:
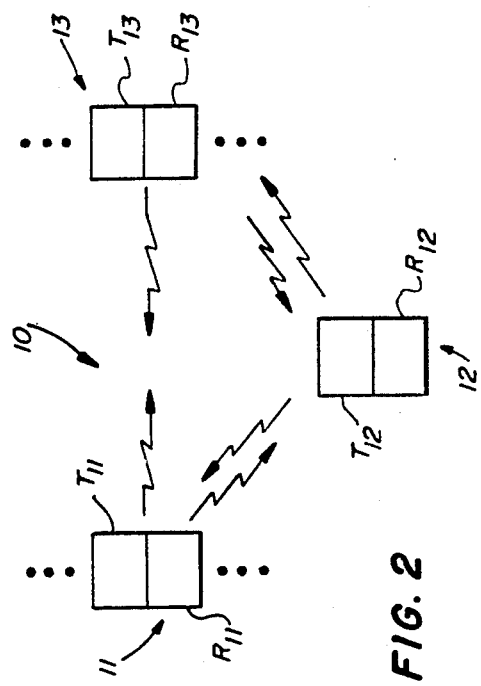
FIG. 2 is a representation of a multichannel communication system in which transmitter and receiver sections are located in a plurality of separated station locations.

Referring to FIG. 2 a secure non-line-of-sight communication system 10 fabricated in accordance with this invention can transmit and receive simultaneously within the same area within the solar-blind region of the electromagnetic spectrum. Selective advances at each transmitter/receiver station 11, 12, 13 in the system enable omnidirectional, nonline-of-sight simultaneous communications. The simultaneous communications are due to the multichannel transmitter capability in each transmitter section $T_{11}$, $T_{12}$ and $T_{13}$ and multichannel receiver capability in each receiver section $R_{11}$, $R_{12}$ and $R_{13}$ of the stations.

The three stations schematically represented in FIG. 2 are for purposes of demonstration of this concept only. It is understood that more or less stations n having transmitter sections $T_n$ and receiver sections $R_n$ could be deployed to best utilize the available frequencies in the multichannel system as will be explained below. Furthermore, each of the transmitter/receiver stations is shown to have a transmitter section T as well as a receiver section R. It is within the scope of this concept to have only transmitter sections or receiver sections at different locations when the best interests of a communication system so dictate. For example, while FIG. 2 shows the transmitter and receiver sections side-by-side, a separation between the transmitter section and its associated receiver section might be desirable to help reduce unwanted backscatter from interfering with the associate receiver section as the transmitter is operated in the transmission mode. Suitable shielding can be included, not shown, if it is felt to be necessary to help offset any signal compromising that might be attributed to a closely adjacent transmitter sections.

Figure 3:
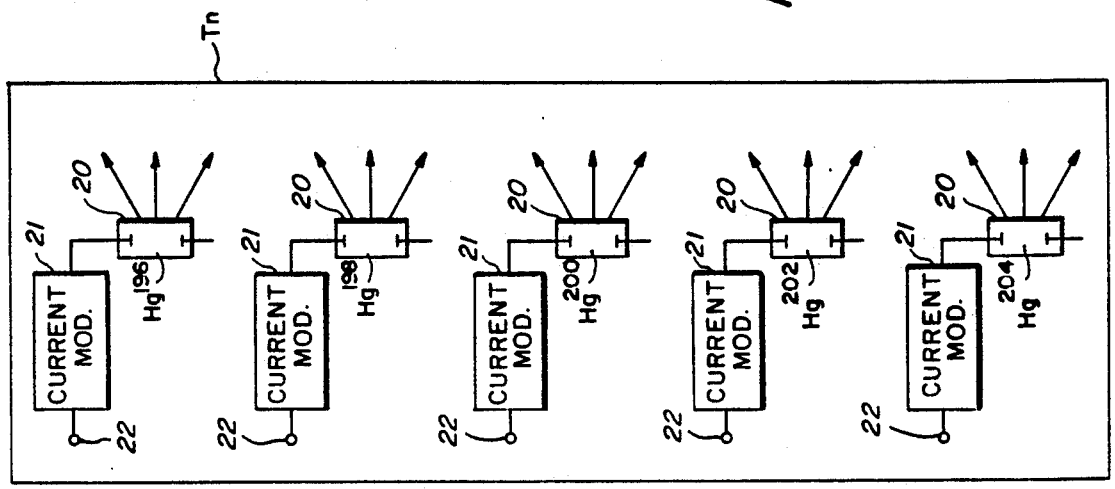
FIG. 3 depicts a typical transmitter section $T_n$.

Looking to FIG. 3 each transmitter section $T_n$ includes at least one discharge germicidal-type lamp 20 that is similar to the lamps referred to above. The discharge tube of each lamp 20 for transmitting only a single-hyperfine line is a straight forward fabrication since all the characteristics of the commercially available germicidal lamp can be kept with the exception that only the mercury of one isotope $Hg^{196}$, $Hg^{198}$, $Hg^{202}$ and $Hg^{204}$ is placed in each discharge tube.

All of the tubes of the discharge lamps 20 can be connected to a suitable on-off current modulator 21 for modulating the radiated discrete lines in accordance with a pulsed sequence appearing at inputs 22. Optionally, the stations in FIG. 2 can each include only a single lamp with a single isotope actuated appropriately by a suitably interconnected on-off current source. In addition, while only three transmitter/receiver stations in an overlapping communications network are shown, as many as five transmitters could be used that each selectively radiate discrete lines in the ultraviolet spectrum from discharge tubes having the even isotopes of mercury, $Hg^{198}$, $Hg^{200}$, $Hg^{202}$ and $Hg^{204}$. Combinations of discharge lamps could be simultaneously actuated to radiate a number of identically modulated lines if desired. A number of such lamps may be operated in parallel and driven by an appropriate modulating on-off current source to increase the level of transmitted power.

Figure 4:
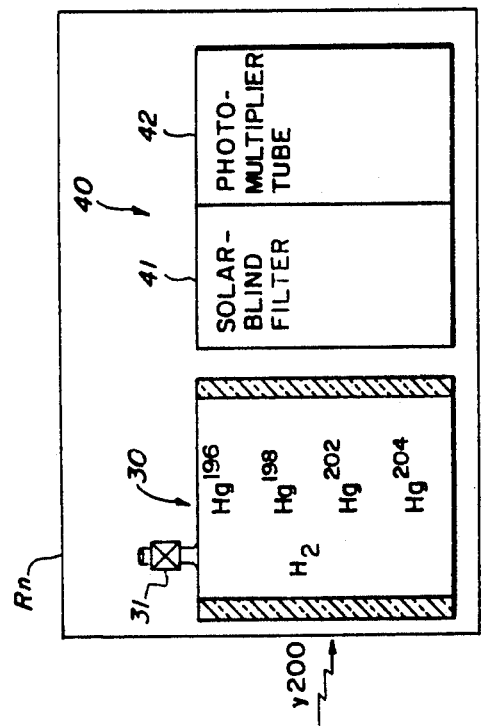
FIG. 4 is a representation of a receiver $R_n$ having a filter section and a solar-blind receiver section.

Referring to FIG. 4, each receiver section $R_n$ includes an absorption filter 30, as well as a solar-blind receiver 40. The solar-blind receiver includes a commercially available wide field of view filter 41 disposed adjacent a photo-multiplier tube 42 for providing output pulses which are represented of the modulated discrete line impinging on the receiver section. A suitable solar-blind receiver including a wide field of view filter-photomultiplier tube combination is set in the U.S. Pat. No. 4,493,114 and provides representative output signals. For the purposes of understanding this inventive concept, the circuitry associated with each solar-blind receiver section can be substantially the same as that of the referenced patent to enable a responsive readout.

Filter 30 is fabricated to have a quartz wall construction with a valved fitting 31 for the introduction of the selected isotopes and quenching gas at temperatures and pressures suitable for an intended application. Atmospheric pressures and room temperatures have been found to be suitable for some systems.

The filter shown selectively passes only a single-hyperfine line $\gamma 200$ and attenuates the other hyperfine lines (associated with $Hg^{196}$, $Hg^{198}$, $Hg^{202}$ and $Hg^{204}$)

sufficiently to suppress other incoming, unwanted radiations, as well as some backscatter noise associated with other near-by UV transmitters. Successful quenching of the undesired discrete lines attributed to other isotopes in the ultraviolet spectrum relies upon the quenching process of the mercury resonance radiation in a foreign gas in this case $H_2$ has been selected. Other quenching gases e.g. $O_2$, $CO$, $CO_2$, $H_2O$ (vapor), $N_2$ etc. could be used at various temperatures and pressures.

Figure 5:
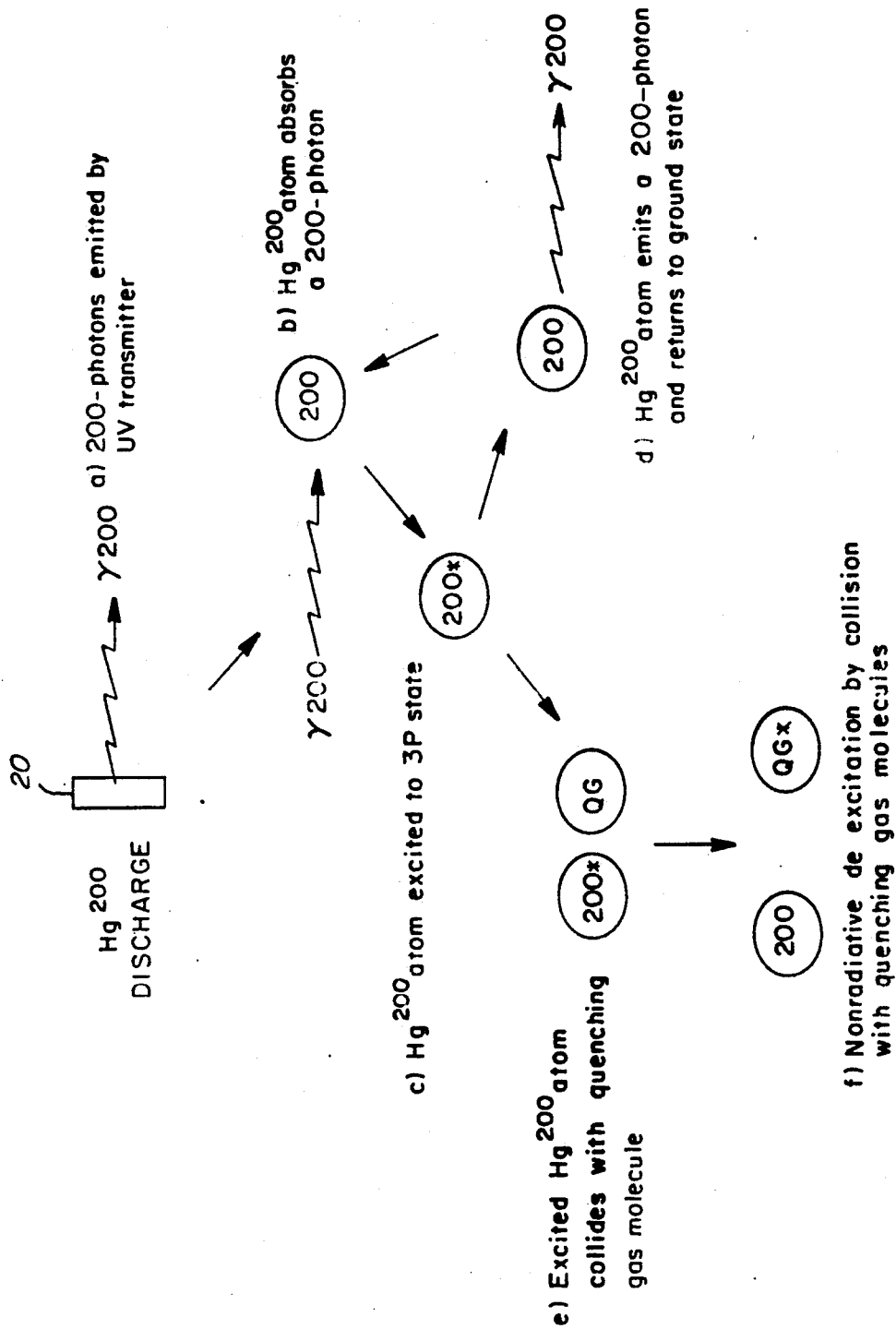
FIG. 5 schematically depicts the quenching process.

The de-excitation process of the mercury resonance radiation in a foreign gas is depicted in FIG. 5. A discharge lamp 20 at a distant transmitter section has only the $Hg^{200}$ isotope which emits only the 200 photons at (a). This radiation which can be absorbed only by a $Hg^{200}$ atom at (b). The $Hg^{200}$ absorbs the 200 photon and is excited to the $^3P_1$ state, see (c). The excited $Hg^{200}$ atom can de-excite by two alternate processes, the first is by reemitting a 200 photon as shown at (d), or by colliding with a quenching gas module as shown at (e) and transferring the excess energy nonradiatively at (f).

The different quenching gases have different quenching efficiencies on the 253.7 nanometer mercury resonance radiation. Argon typically has been chosen for use in germicidal tubes because it is a relatively inefficient quencher, so that the UV radiation can escape the tube before being quenched. The quenching efficiency is dependent on the fill gas density (pressure) and the gas temperature. Obviously, the more quenching gas molecules there are, the greater the likelihood of collision with excited mercury atoms, that is, more quenching. Higher gas temperature means greater molecular movement and thus more collision and quenching and overlapping of lines which leads to cross talk.

The mercury hyperfine lines of interest, those being the discrete lines attributed to the even isotopes of mercury, are none-overlapping at room temperature. Maintaining the filters at a temperature higher than room temperature will lead to greater quenching of the discrete line to be quenched, but to high a temperature results in the quenching of the other hyperfine lines as well. Thus the attenuation of a particular hyperfine line and the allowing of another line to pass, is dependent on a proper maintenance of temperature and pressure at absorption filter 30 at each receiving station.

Figure 6:
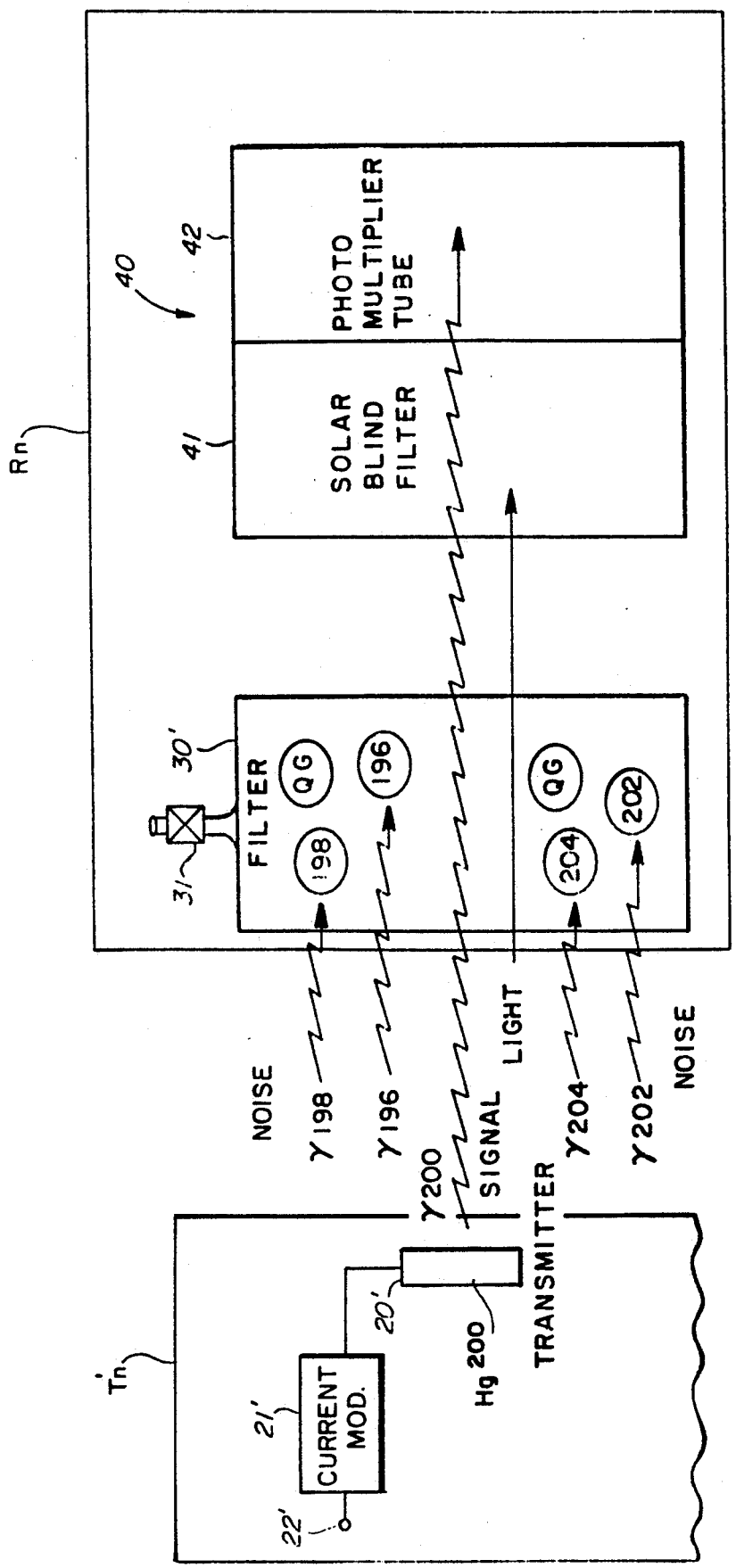
FIG. 6 shows in greater detail the workings of a typical filter receiving $Hg^{200}$ photon radiation.

Another name for aborption filters 30 are the atomic resonance absorption filters, noting FIG. 6. This filter is designed to pass radiation from lamp 20' that contains a $Hg^{200}$ isotope. The filter 30' contains a quenching gas, QG, and mercury isotopes of $Hg^{196}$, $Hg^{198}$, $Hg^{202}$ and $Hg^{204}$ designated by the encircled numbers. Since the filter does not contain isotope $Hg^{200}$, the $\gamma 200$ radiation will not interact in the filter and passes through. The radiation from the other even isotopes is absorbed and quenched by their corresponding mercury isotopes and quenching gas present in the filter. The atomic resonance filter works by absorbing radiation from several isotopes, at several orders of magnitudes more efficiently than radiation from the modulated isotope carrying the information. This assures that unwanted backscatter is suppressed from other UV transmitters in the same locality.

Obviously, many modifications and variations of the present invention are possible in the light of the above teachings. It is therefore to be understood that within the scope of the appended claims the invention may be practiced otherwise than as specifically described.

I claim:

1. An apparatus for omnidirectionally communicating non-line-of-sight in a frequency channel in the ultraviolet spectrum to provide the capability for simultaneous communications in the solar-blind region of the electromagnetic spectrum comprising:
   means consisting of a single isotope of mercury for generating a descrete line in the ultraviolet spectrum and omnidirectionally radiating it;
   means coupled to the generating means for modulating the discrete line in the ultraviolet spectrum to enable the omnidirectional radiation of a modulated discrete line; and
   means disposed from the omnidirectionally generating means in a non-line-of-sight relationship for receiving and demodulating the omnidirectionally radiated said modulated discrete line in a wide field of view, the receiving demodulating means is provided with isotopes of mercury other than said single isotope and a radiation quenching gas to enable a passing of only said modulated discrete line and a selected communication via said modulated discrete line.

2. An apparatus to claim 1 in which the omnidirectionally communicating is in a plurality of frequency separated channels and further including:
   a plurality of generating means each consisting of a different single isotope of mercury for each generating a different discrete separate line in the ultraviolet spectrum;
   a plurality of modulating means, each connected to a different one of the generating means for the modulation of a different discrete separate line; and
   a plurality of receiving and demodulating means, each having a quenching gas and a plurality of isotopes of mercury except for the isotope which produces a desired said different discrete separate line of a selected communication.

3. An apparatus according to claim 2 in which each generating means includes a discharge lamp that consists of a single isotope and the modulating means is an on-off keying circuit to switch the generating means in a series on-off pulses of said different discrete separate line in the ultraviolet spectrum in response to an information signal.

4. An apparatus according to claim 3 in which each receiving and demodulating means includes:
   an absorption filter containing a quenching gas and the other isotopes of mercury that define other discrete lines in the ultraviolet spectrum other than said different discrete separate line of a selected communication so that photons of said different discrete separate line of the selected communication pass therethrough and the other discrete lines from the plurality of generating means are absorbed and quenched; and
   a photomultiplier tube disposed in-line with its respective absorption filter to provide representative output pulses of the passed photons of said different discrete separate line of the selected communication.

5. An apparatus according to claim 4 in which each isotope of mercury is an even numbered isotope such as $Hg^{204}$, $Hg^{202}$, $Hg^{200}$, $Hg^{198}$ and $Hg^{196}$.

6. An apparatus according to claim 5 in which the absorption filter is fabricated to contain the isotopes and quenching gas at varying pressures and temperatures.

* * * * *